Figure 1:
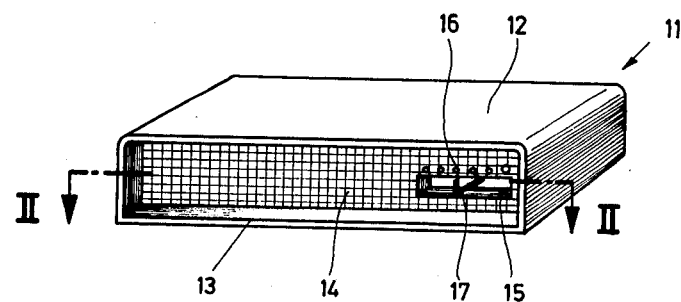

United States Patent [19]

Faller

[11] 4,045,769
[45] Aug. 30, 1977

[54] LIGHTING SYSTEMS FOR VEHICLES

[75] Inventor: Hermann Faller, Guetenbach, Germany

[73] Assignee: Faller OHG, Guetenbach, Germany

[21] Appl. No.: 671,934

[22] Filed: Mar. 30, 1976

[30] Foreign Application Priority Data
Apr. 3, 1975 Germany ............................. 2514611

[51] Int. Cl.² ........................... B60Q 1/26; B60Q 1/08
[52] U.S. Cl. ........................................ 340/74; 315/82
[58] Field of Search ...................... 340/74; 315/82, 83, 315/159; 307/10 LS

[56] References Cited
U.S. PATENT DOCUMENTS

| 3,591,825 | 7/1971 | Keighley, Jr. | 315/82 |
| 3,694,690 | 9/1972 | Shimizu et al. | 315/82 |

Primary Examiner—Donald J. Yusko
Attorney, Agent, or Firm—Brumbaugh, Graves, Donohue & Raymond

[57] ABSTRACT

The present specification describes and claims a light dependent device for use in motor vhicles, for monitoring the environmental light and providing warning when regulation lights on the vehicle should be switched on or off. The device comprises a light sensor connected to a switching element which is adapted both to be connected to the light circuit of a vehicle and to, in use, switch when the intensity of the light falling on the light sensor passes a level at which regulation lights on the vehicle should be switched on, and a warning device. The warning device is arranged to be activated by the switching of the switching element when the light intensity falls below said level and to be deactivated by the switching element both when the light intensity exceeds said level and, when in use and connected in the lighting circuit of a vehicle, when the regulation lights are switched on.

21 Claims, 5 Drawing Figures

LIGHTING SYSTEMS FOR VEHICLES

The present invention relates to a light-dependent device for use in motor vehicles, for monitoring the environmental light and providing a warning when regulation lights on the vehicle should be switched on or off.

Such a device has become known from German Pat. No. 2,245,568. This describes an automatic control device for the external lightining system of vehicles wherein the external lighting system of the motor vehicle is automatically switched on or off in dependence upon light intensity. This known control device is fitted with numerous devices and properties which enable almost complete consideration of all factors and reasons which might lead to connection or disconnection of the lights. Thus, for example, a varying time lag is provided for connection and disconnection which prevents connection or disconnection for short periods of increased darkness or light. A switching hysteresis is provided which prevents connection or disconnection at only slight changes in light intensity and the need for earlier connection of the lights in wet conditions is taken into account in that switching on the windscreen wipers displaces the switching threshold towards a greater light intensity. In the known device, the light sensor may be disposed in the region of the pedal area in the front part of the motor vehicle interior, i.e. below the dashboard. Whilst the electronics of this device may be manufactured relatively easily and inexpensively, an electro-mechanical relay is required however in order to control the quite substantial current magnitudes required for the external lighting system of a motor vehicle. This relay not only represents a substantial cost factor but also increases the volume of the device so that it is necessary to provide a light sensor with its adjusting mechanism and a function switch in a special housing which is accommodated separately from the actual control device which contains the electronics and the relay. The control device must also be connected to several terminals, for example six terminals to the lighting system and these terminals must partially be adapted for higher current magnitudes, namely the current consumption of the external lighting system. It is therefore advisable for only skilled amateurs or mechanics to connect the known control device if it is acquired as an accessory.

The aim of the present invention is to provide a device which monitors the environmental light intensity and provides a warning when the external lights of the vehicle should be switched on or off which device is of substantially simpler construction and may be connected more easily than the device disclosed in German Pat. No. 2,245,568.

According to the present invention there is provided a light dependent device for use in motor vehicles, for monitoring the environmental light and providing warning when regulation lights on the vehicle should be switched on or off, said device comprising a light sensor connected to a switching element which is adapted to be connected to the light circuit of a vehicle and to, in use, switch when the intensity of the light falling on the light sensor passes a level at which regulation lights on the vehicle should be switched on, warning device being arranged to be activated by the switching element when the light intensity falls below said level and to be deactivated by the switching element both when the light intensity exceeds said level and, when in use and connected in the lighting circuit of a vehicle, when the regulation lights are switched on.

This device does not therefore automatically switch on the external lighting system but only indicates to the driver when he ought to switch his lights on. When the driver then switches the regulation lights on, the warning light is switched off again. The electronic construction of such a device may be substantially simpler than the known control device and in particular the device dispenses with the need for a power relay. It is also possible to manage with only two or three terminals which may easily be undertaken by a layman using instructions. The volume taken up by the device is so small that the electronics together with the sensor and the warming device may be accommodated in a small box at the point most suitable for the sensor.

Although it might also be possible to use a buzzer or some other acoustic signalling device as a warning device, it is advantageous to use a warning light. This may be a flashing light, it being particularly preferable for the flashing light to be disposed in optical feedback with the light sensor and to produce flashing by means of a time delay device. This time delay device is at any rate advantageous for the device in order to prevent the warning device flashing each time the vehicle passes through a dark entrance way.

Figure 2:
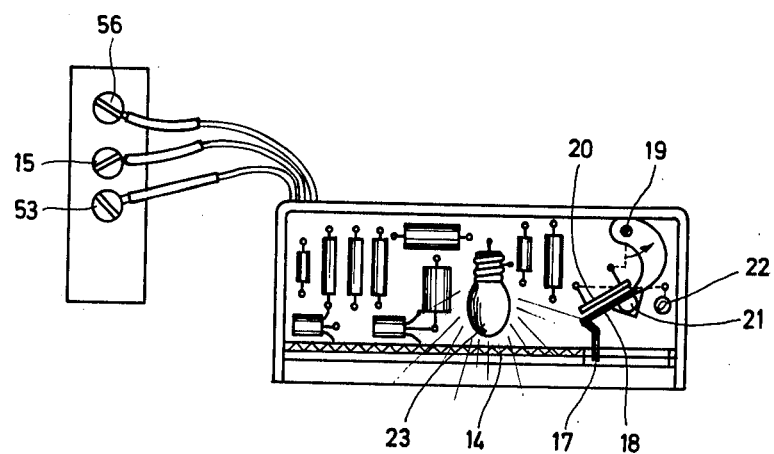
Figure 3:
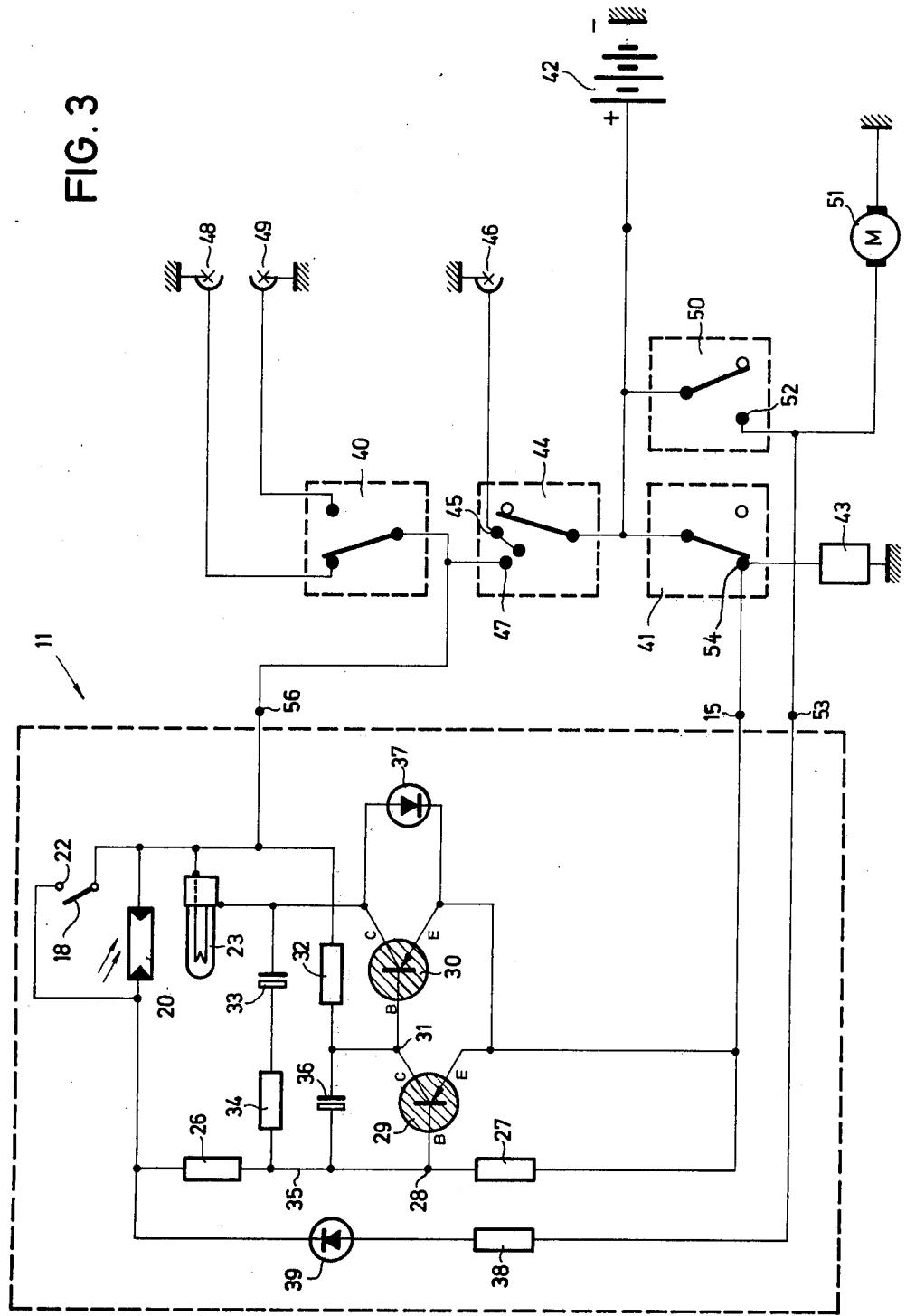
Figure 4:
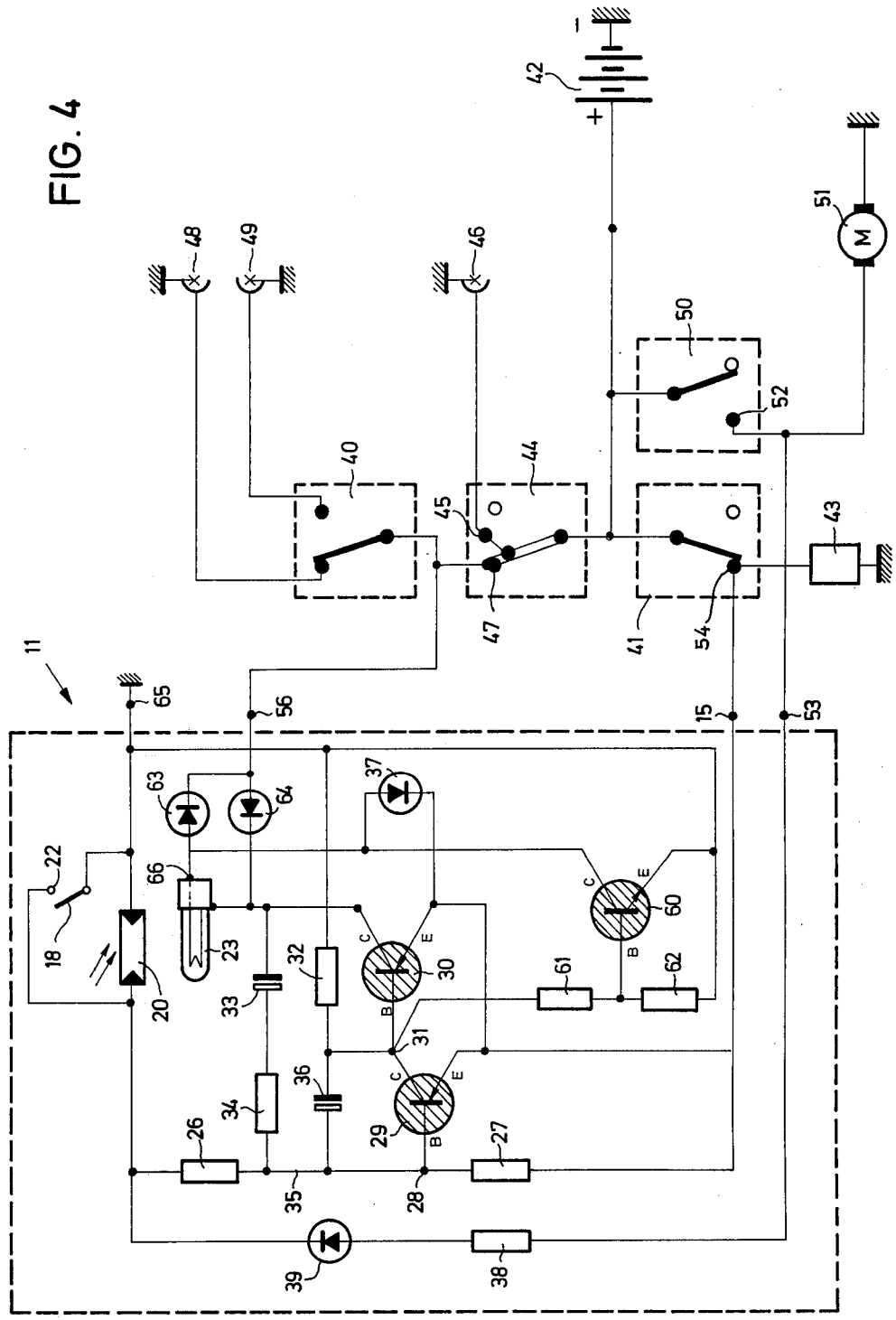
Figure 5:
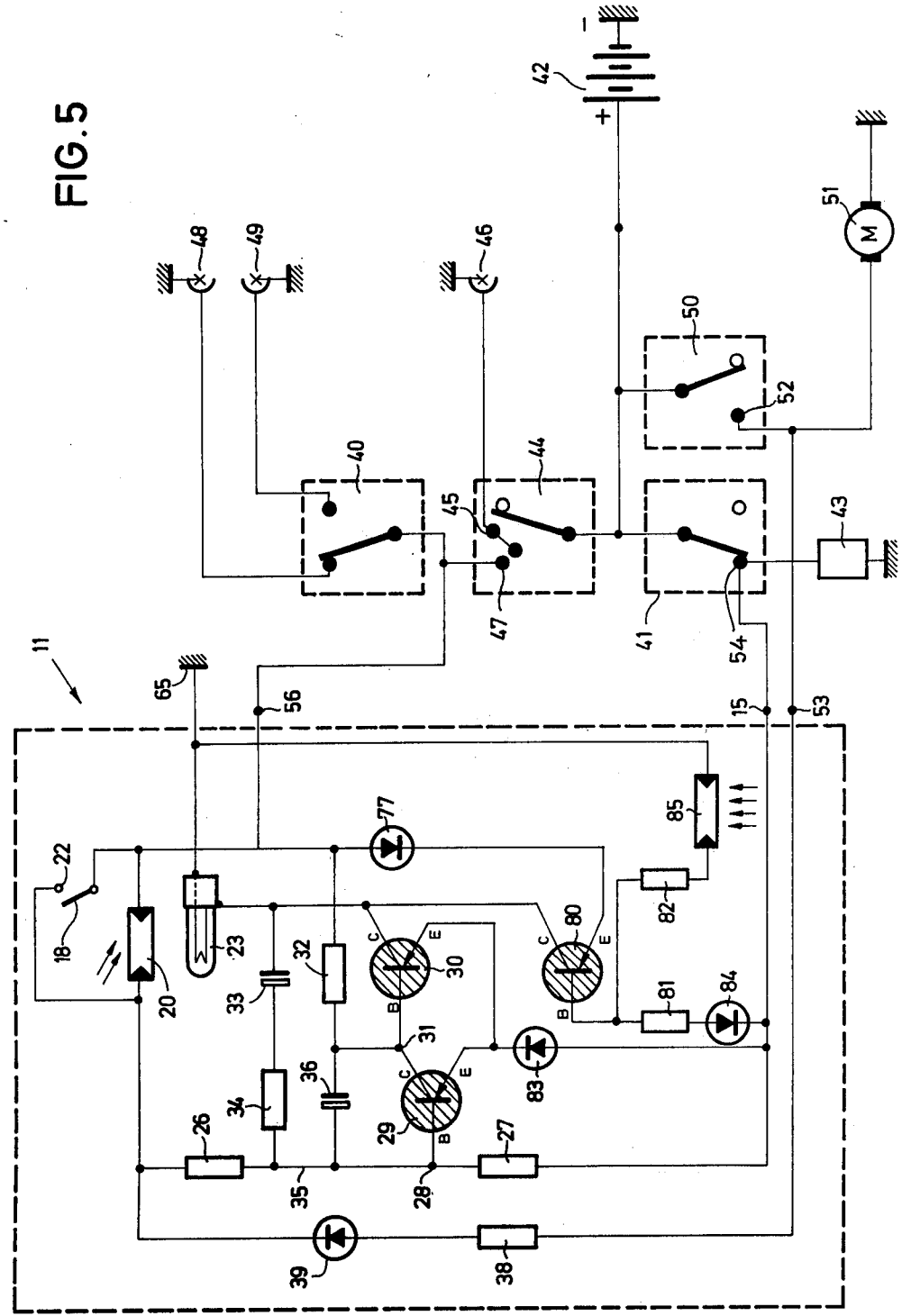

The present invention will now be further described, by way of example, with reference to the accompanying drawings, in which:

FIG. 1 is a perspective outer view of one embodiment of a device constructed according to the present invention, FIG. 2 is a section along the line II—II of FIG. 1, FIG. 3 is a wiring diagram of one embodiment of the present invention connected to a part of a motor vehicle lighting system, FIG. 4 is a wiring diagram of a further embodiment of the present invention connected to a part of a motor vehicle lighting system; and FIG. 5 is a wiring diagram of a still further embodiment of the present invention connected to a part of a motor vehicle lighting system.

The device 11 has a housing 12 in the form of a small box which is drawn approximately to actual size in the accompanying drawings. The housing 12 has a small depth and is flat and may be mounted in the region of the pedal area of a motor vehicle interior, i.e. under the dashboard, in such a manner that its front side 13 faces towards the driver. The front side 13 of the housing 12 is transparent, it being closed, for example, by a light-transmitting grooved pane 14. In the pane 14 there is a slot 15 in whose vicinity an adjusting scale 16 is provided. An indicator 17 projects through the slot 15 and is arranged to adjust a shutter 18 (FIG. 2) which is pivotable about an axle 19. The shutter 18 may be pivoted to a greater or lesser extent in front of a light sensor 20 so that, depending upon the position of the shutter, the sensor receives a greater or lesser amount of the light passing in through the pane 14. In this illustrated embodiment, the light sensor is a photoconductive cell.

The shutter has a contact surface 21 which, when the shutter swivels anti-clockwise as viewed in FIG. 2, to the end position in which the shutter covers the photoconductive cell least or not at all, co-operates with a fixed contact 22 which is connected to a terminal of the light sensor. The other terminal of the light sensor is connected to the shutter so that the shutter forms a switch by means of which the light sensor 20 may be short-circuited.

From FIG. 2 it may be seen that electronic components are disposed on a plate in the housing 12, on which plate the axle 19 is also disposed. The electronic components are connected in a printed circuit on the rear side of the plate which is not visible in FIG. 2. A warning light 23 in the form of a conventional bulb is mounted next to the light sensor 20 though as its light may also fall on the light sensor 20, both directly and indirectly as a result of stray reflection on the pane 14, the light sensor is slightly tilted away from light 23 so as to prevent the direct influence of the light 23 on the light sensor from becoming too great. The device 11 is connected by three connection leads to terminals 56, 15 and 53 of the motor vehicle's electric circuit. These terminal designations are the corresponding standardized terminal designations in motor vehicles.

FIG. 3 shows the circuit of one embodiment of a device according to the present invention. The circuit includes a voltage divider, one branch of which is connected to the terminal 56 and contains the light sensor 20 and a resistor 26. The other branch of the voltage divider is connected to the terminal 15 and contains a resistor 27. Two pnp transistors 29, 30 are connected in a Schmitt trigger. The base of input transistor 29 of the Schmitt trigger is connected to the voltage divider point 28, i.e. between the resistors 26 and 27, and the collector of the transistor 29 is connected to the base B of the output transistor 30 of the Schmitt trigger. The emitters of the two pnp-transistors 29, 30 are applied across the terminal 15 whilst the base B of the transistor 30 (collector of the transistor 29) is connected by a resistor 32 to the terminal 56. The collector C of the transistor 30 is connected by the bulb forming the warning light 23, to the terminal 56.

The collector C of the transistor 30 is also connected by an electrolytic capacitor 33 and a resistor 34 to the branch 35 of the voltage divider lying between the voltage divider point 28 and the resistor 26, and the collector C of the transistor 29 is also connected by an electrolytic capacitor 36 to this branch 35.

The light sensor 20 may, as already described with reference to FIG. 2, be bypassed by the switch formed by the shutter 18 and the contact 22. The collector C and the emitter E of the output transistor 30 are bypassed by a diode 37 which permits current to flow from the terminal 56 by way of the light 23 to the terminal 15 but prevents a corresponding return flow of current.

The terminal 53 is connected by a resistor 38 and a diode 39 to a branch of the voltage divider between the resistor 26 and the light sensor 20. This diode permits current to flow from the terminal 53 toward the voltage divider and also blocks the return flow if the terminal 53 is connected to negative polarity.

This device 11 as described hereabove, is connected by the three named terminals 56, 15 and 53 to the electric circuit of the motor vehicle. FIG. 3 illustrates terminal 15 connected directly to a terminal 54 of an ignition switch 41, the so-called daily consumers 43, which are only shown diagrammatically, such as the ignition coil, fuel pump etc, being also connected to this terminal 54 of the ignition switch 41. This ignition switch supplies current to the vehicle battery 42 and the so-called daily consumers 43, and it is assumed in this case that, as is generally the case, the negative polarity is earthed so that in the connected position of the ignition switch as shown in FIG. 3 the daily consumers 43 receive the positive polarity by way of this switch.

FIG. 3 also illustrates terminal 56 connected both to a terminal of a dip switch 40 and a terminal 47 of a light switch 44.

The light switch 44 of the vehicle is shown in a disconnected state. In an intermediate position it may only be connected to a contact bridge 45 by means of which parking or dipped lights 46 of the vehicle may be switched on, whilst in the left position of FIG. 3 the contact bridge 45 and a light contact 47 are connected to the positive polarity so that the parking lights 46 and the dip switch 40 of the vehicle are supplied with current.

The dip switch 40 has two switching positions of which the illustrated left position supplies current to the dipped light 48 and the right switching position supplies current to the main beam light 49.

A wiper switch 50, which is shown in the disconnected position, is connected to the positive pole of the battery 42, in the illustrated example in front of the ignition switch 41. When, howver, the switch is thrown to connect the single-contact 52 to the battery, a windscreen wiper motor 51 is connected to the positive pole of the battery or of the vehicle's electric circuit. This single-contact 52 is connected to the terminal 53 of device 11. Alternatively terminal 53 can form the single contact of wiper switch 50.

The device operates as follows:

When driving during the day and in dry weather, the various switches are normally in the position shown in FIG. 3, i.e. the wiper switch 50 is switched off, the ignition switch 41 is switched on, the light switch 44 is off and the dip switch is in one of its two positions but preferably in the illustrated dip position. Thus, the terminal 15 is connected by way of the ignition switch 41 to the positive pole of the battery and the terminal 56 is connected by way of the cold filament of the dim light 48 to earth, i.e. to the negative pole. Also the terminal 53 is connected by way of the winding of the wiper motor 51 likewise to the negative pole which, in this position, does not affect the device 11 because the diode 39 blocks in this direction.

In bright light the light sensor 20 is a low-resistance so that the voltage at the point 28 i.e. at base of the input transistor 29, tends towards negative and thus the pnp-transistor 29 conducts. Current therefore flows from the terminal 15 through emitter E and collector C of the transistor 29 and through the resistor 32 to the terminal 56. The base B of the transistor 30 thus receives a positive potential and this output transistor 30 remains blocked. The light 23 therefore does not come on.

If the vehicle continues into dusk, the light sensor 20 becomes a higher-resistance owing to the reduced light incident thereon and the voltage ratios of the voltage divider shift in such a manner that the voltage increases as the point 28. The transistor 29 will consequently block and the point 31, i.e. the base of the output transistor 30 is connected by the resistor 32 and the terminal 56 to negative potential so that the transistor 30 becomes conductive and a current can flow from the positive battery pole by way of the terminal 15, the emitter and collector of the transistor 30 to the bulb 23 which lights up. However, before transistor 30 comes to the point of being conductive, the capacitors 33 and 36 effect a time delay. Both capacitors have been charged correspondingly, the capacitor 33 by way of the resistor 34 by the positive potential of the base voltage at 28 and by the negative potential conducted by way of the cold filaments of the lights 23 and 48 or 49, and the capacitor 36 by the positive potential at 31 of the transistor 29 and the negative potential at the differential voltage point of the voltage divider member 20, 26, 27, i.e. at the base 28 of the transistor 29. Since in sudden darkness the resistance value of the light sensor 20 increases rapidly, the base voltage would similarly increase immediately. However, the capacitor 36 as a result of its discharge or change in charge only allows the voltage at the point 28 to increase slowly with the result that a random switching-on time delay may be determined depending upon the size of the capacity of the capacitor 36. In the reverse switching state of the transistor 29, the capacitor 36 correspondingly produces a switching-off time delay.

When the transistor 30 is conductive, the warning light 23 receives voltage, lights up and illuminates the light sensor 20. At the same time, however, the polarity or charge of the capacitor 33 is changed whereupon the base point 28 receives a short, powerful, positive overload so that when the photoconductive cell 20 is illuminated the transistor 29 does not immediately conduct but only once the overload has levelled out by way of the now low-resistance illuminated photoconductive cell 20 to the switching voltage of the transistor 29. This time delay is also assisted by the capacitor 36 since this too has been charged up to the increased voltage. The greater the capacity of this capacitor, the longer the on- and off-switching time delays. The resistor 34 connected between the capacitor 33 and the voltage divider, serves only to attenuate during the switching-over process and is not absolutely necessary. The light 23 therefore flashes at invervals. Initially, at the onset of dusk, the flashing is shorter than in complete darkness since the variable ohmic resistance of the photoconductive cell 20 acts correspondingly upon faster or slower discharge of the capacitor 36. Conversely, the capacitor 36 acts also by way of the -switching -off time delay of the transistor 29 and thus the -switching -on time delay by the transistor 30 upon the warning light, i.e. the warning light 23 is not switched on for only short periods of darkness (e.g. when the vehicle passes through a gateway). When the light 23 is in its switched-on state, the capacitor 33 supplies a positive potential which counteracts disconnection to the point 28 and therefore effects a hysteresis or switching threshold so that the warning light is not switched off until a slightly higher light intensity value ensues than that at which connection took place. This eliminates the annoying connection and disconnection of the device for only slight differences in light intensity.

For rain, snow or thick fog, the driver will switch on the windscreen wipers with the switch 50. Consequently, instead of its previous negative polarity, the positive pole of the battery is connected to the terminal 53. Through the resistor 38 and the diode 39 a current can therefore flow which alters the voltage divider ratio and causes the potential at the point 28 to shift into positive. As a result, even at greater light intensity values, the transistor 29 is disconnected and the transistor 30 is connected through. The on- and off- switching values, i.e. the entire threshold range is consequently displaced into a range of greater light intensity so that the warning device 23 responds at a light intensity which, in dry weather, would not necessarily lead to the regulation lighting being switched on.

The warning device described in the present embodiment as a flashing light lies in the (indirect) field of vision of the driver and warns him that he should switch on the main head lights. When the driver then switches on the regulation head lights by means of the light switch 44, the positive polarity is connected to the contact 47 and thus also to the terminal 56. This terminal therefore has the same polarity as the terminal 15 so that the entire device has no potential difference and is switched off. The warning light 23 goes off. It is immaterial whether the main beam or the dim light has been switched on. If, however, as frequently happens the driver accidentally only switches the light switch through to the contact 45, i.e. into the parking light position the warning light 23 continues to flash which is desirable as this is not regulation lighting for driving.

Quite frequently vehicles, in particular after trips through fog or tunnels, are parked with their external lighting system still switched on which leads to undesirable discharging of the battery. The device also warns against this common error, namely in the following way:

When the head lights are switched on, a positive polarity is connected by way of the contact 47 to the terminal 56. If now disconnection of the ignition switch 41 separates the positive polarity from the terminal 15, the latter is connected by way of the daily consumers 43, which are deprived of current by means of this ignition switch, to earth. A current then flows from the terminal 56 by way of the light 23 and the diode 37 to the terminal 15 so that the light 23 is lit. It is continuously lit, i.e. it does not flash, so that in this case there is a distinct difference between the signals "Lights should be switched on" (flashing) and "Lights should be switched off" (no flashing).

It was already mentioned with reference to FIG. 2 that the shutter 18 may be used to adjust the aperture allowing light through to the light sensor 20. An adjustment towards darkening the light sensor means that the warning device responds earlier (to greater light intensity), whilst opening of the light inlet effects a later response. When the shutter is moved in the direction of later response, the warning device is put out of operation as regards indicating the connection of lights by short-circuiting the light sensor 20. This may be desirable, for example in countries with different regulations. If for example, driving with only parking lights i.e. side lights, is required in towns, it would undoubtedly be desirable to disconnect the warning device which would otherwise be constantly flashing. However, the warning light against parking with head lights on remains in operation even with the light sensor short-circuited.

FIG. 4 is a circuit diagram of a further embodiment of the present invention which coincides with that of FIG. 3 as regards part of the basic circuit, the terminals and the illustrated parts of the vehicle lighting system. Identical parts have therefore the same reference numerals and correspond in their arrangement and function to the construction of FIG. 3.

There is a modification, however, in FIG. 4 inasmuch as an npn-transistor 60 is provided in addition to transistors 29 and 30, whose base B is connected to the voltage divider point of a voltage divider which is formed by two resistors 61, 62. This voltage divider is connected on one side to the point 31, i.e. the collector C of the transistor 29 and the base B of the transistor 30 of the Schmitt trigger and on the other side to an additional (compared with FIG. 3) earth terminal 65 which therefore represents an independent connection with the negative potential of the vehicle lighting system. Unlike FIG. 3, the branch 35 of the main voltage divider 20, 26, 27 containing the light sensor 20 is also connected to this earth terminal 65. The terminal 56 is connected by way of a diode 64 which blocks current from flowing back to terminal 56 to the terminal of the warning light 23 which is connected to the collector C of the transistor 30, the other terminal 66 of the warning light 23 being connected on the one hand to the terminal 56 by way of a diode 63 which blocks in the opposite direction to that of the diode 64, and on the other hand to the collector C of the transistor 60, whose emitter is connected to the branch of the voltage divider 61, 62 leading to the terminal 65.

It should also be mentioned that, as a modification to the embodiment of FIG. 3, the resistor 32 is connected not to the terminal 56 but to the earth terminal 65, and the diode 37 is connected by one of its poles not directly to the collector C of the transistor 30 but to the terminal 66 of the warning light 23 or the collector C of the transistor 60.

The device of FIG. 4 operates as follows:

As regards the mode of operation for warning against accidentally not switching on head lights during darkness or against parking the vehicle with the head lights switched on, the device of FIG. 4 operates identically to that of FIG. 3. There it is described how the input transistor 29 conducts when there is light on the light sensor 20 and the output transistor 30 is therefore non-conductive. The connection point 31 between these transistors is thus connected in this switching state to the positive voltage potential. The base B of the transistor 60, as a result of the dimensioning of the voltage divider 61, 62, is likewise connected to the positive potential and owing to its npn-construction is conductive with this positive control voltage so that the terminal 66 of the warning light 23 is connected by the collector C and the emitter E of the transistor 60 to the earth terminal 65. If therefore, as is shown in FIG. 4, the light switch 44 is switched on through connection with the light contact 47, the warning light receives positive voltage by way of the terminal 56 and the diode 64 and the warning light is lit uniformly and continuously. This is therefore a different signal to the flashing of the signal light when there is not adequate light and the head lights are switched off.

When the head lights are switched off by means of the switch 44, the warning light 23 also goes out because the positive potential is withdrawn and the device is ready to continue monitoring light intensity.

If the light intensity of the environment then decreases, the transistor 29 is disconnected in the manner described with reference to FIG. 3 and the point 31 is no longer connected to positive but by way of the resistor 32 to negative, with the result that the transistor 60 is disconnected so that the terminal 66 is no longer connected by the transistor 60 to the earth terminal 65 but by way of the diode 63 to the terminal 56 and thus by way of the dim switch 40 and the filaments of the vehicle headlights 48, 49 to earth.

Since, however, the transistor 30 is virtually simultaneously made conductive, the warning light 23 receives voltage via transistor 30 and starts to flash. The diode 64 prevents short-circuiting of the light 23. If the main or dipped beam (48, 49) of the headlights is switched on by means of the light switch 44, the negative potential is withdrawn from the warning light 23 so that it is estinguished.

It can therefore be seen that by means of the additional circuit of FIG. 4 the device also serves to indicate the very frequent occurrence where the driver, for example after underground parking, a tunnel or the like, forgets to switch off the main headlights. This omission to switch off is not directly dangerous to traffic but it does cause some disturbance and irritates other road users. The described and illustrated device for warning against driving with headlights on in adequate daylight is so designed that it is always ready for operation when the external light intensity value adjusted at the light sensor 20 and required for disconnection of the lighting system is attained. If therefore one had been driving up to this point with the regulation lighting, when the disconnection light intensity value was exceeded the device would automatically indicate: "Lights should be switched off." The continuously lit, non-flashing light, on the contrary, does not disturb the driver when driving with headlights on in the fog, or at any rate greater light intensity. In these very conditions he can always check by referring to the warning light whether he has in fact switched on his headlights.

As the circuit illustrated in FIG. 5 shows, it is also possible to warn against driving with headlights in daylight by means of a second light sensor. In the circuit of FIG. 5 this aim is achieved by means of the following modification as compared with FIG. 3. One terminal of the warning light 23 is connected not to the terminal 56 but to an independent earth terminal 65 of the vehicle. This earth terminal 65 is also connected to one side of a second light sensor 85 (photoconductive cell) a resistor 82 being connected to the other side of this second light sensor. This branch i.e. light sensor 85 and resistor 82, is connected to the base B of a pnp-transistor 80, the base of transistor 80 also being connected to terminal 15 by way of a resistor 81 and a diode 84 which conducts towards the terminal 15. The emitter E of the transistor 80 is connected by a diode 77, which conducts towards the emitter E, to the terminal 56 and the collector C is connected to the collector C of the transistor 30. A diode 83 is connected between the junction of the emitters E of the transistors 29 and 30 of the Schmitt trigger and the terminal 15 and has a conducting direction towards the emitters as a protection against return current.

When the main driving lights i.e. headlights are switched on, positive potential is connected by way of the terminal 56 and the diode 77 to the emitter E of the transistor 80, whose base B is connected on the one hand by way of the resistor 82 and the light sensor 85 to the negative pole i.e. earth, and on the other hand by way of the resistor 81 and the diode 84 to the terminal 15 which has positive potential when the ignition switch 41 is switched on. The diode 84 blocks this path however. In darkness, the light sensor 85 is a high-resistance and the base B of the transistor 80 has not sufficient negative voltage to become conductive. The transistor 80 only becomes conductive once light falling on the light sensor 85 causes the negative potential from the terminal 65 to come through more strongly to the base. The light 23 then receives current continuously through the transistor 80. When the light switch 44 is switched off, the terminal 56 is connected to negative and the warning light 23 goes out.

When the ignition switch 41 is switched off and the headlights are on, the base B of the transistor 80 is connected by the branch 81, 84 to negative potential so that the transistor connects through and allows the light 23 to be lit for as long as the positive pole is connected to the terminal 56 by way of the connected light switch 44.

Of the described and illustrated embodiments, numerous modified forms are possible within the framework of the invention as defined in the appended claims. Thus it is, for example, possible to include the device in the electric circuit of the motor vehicle at the time of manufacture and correspondingly to install the circuit, the light sensor and the warning light directly into the dashboard. However, it is advantageous to dispose the light sensor in the region of the front pedal area since it has been proved that this spot has the most uniform light conditions independent of dazzle etc. The device according to the present invention only requires the driver to manually actuate the light switch but as regards the security against driving without headlights it has the same effect as a more sophisticated automatic lighting system which is also more complicated to connect up. The driver retains a sense of when the headlights are on or off so that he does not become completely unaccustomed to this activity if he then drives a vehicle without any light-dependent device.

If regulations require driving with some other form of external lighting than dipped or main beam, e.g. parking lights, the circuit may be easily adapted to this. In the illustrated and described device, it only requires the terminal 56 to be connected to the contact bridge 45 instead of to the contact 47 for the warning light to be switched off when the parking lights or the dipped lights or the main beam are on.

I claim:

1. A light dependent device for use in a motor vehicle having regulation lights, a lighting circuit and an ignition switch, said device being operative to monitor the environmental light and the condition of the ignition switch and provide warning when the regulation lights on the vehicle should be switched on or off, said device comprising a light sensor and a switching element including a warning device, the light sensor being connected to the switching element which is adapted to be connected to the lighting circuit and ignition switch of the vehicle and, in use, to switch when the intensity of the light falling on the light sensor passes a level at which the regulation lights on the vehicle should be switched on, the warning device being arranged to be activated by the switching element (1) when the light intensity falls below said level with the ignition switch on and the regulation lights off, and (2) when the ignition switch is turned off with the regulation lights on; and to be deactivated by the switching element (1) when the light intensity exceeds said level with the ignition switch on and regulation lights off, (2) when the regulation lights are switched on with the ignition switch on and light intensity below said level, and (3) when the regulation lights are switched off with the ignition switch off.

2. A device according to claim 1, wherein a flashing light constitutes the warning device, the flashing light being disposed in optical feedback with the light sensor, a switching time delay device being provided to produce the flashing.

3. A device according to claim 1, wherein the warning device can be switched on directly by the switching element, an electronic component forming said switching element.

4. A device according to claim 2 wherein the warning device can be switched on directly by the switching element, an electronic component forming said switching element.

5. A device according to claim 1, wherein one terminal of the device is connected to a dip switch of the lighting circuit of the vehicle in such a manner that, when the headlights are switched on, the polarity of this terminal changes compared with the state when these lights are switched off.

6. A device according to claim 5, wherein another terminal of the device is connected to the ignition switch of the vehicle in such a way that when the ignition is switched on it is connected to voltage.

7. A device according to claim 6, wherein the terminals have the same polarity when the headlights and ignition are switched on.

8. A device according to claim 6, wherein daily consumers of the vehicle are connected to the ignition switch in such a way that when the ignition is switched on they are connected to voltage, and when the ignition is switched off, they provide an electrical path to ground, and wherein said switching element further includes a diode for passing current from said one terminal through said warning device and said daily consumers when the ignition switch is off.

9. A device according to claim 1, wherein a light forms the warning device and is arranged to light up without flashing when the ignition is switched off and the headlights are on.

10. A device according to claim 9, wherein daily consumers of the vehicle are connected to the ignition switch in such a way that when the ignition is switched on they are connected to voltage, and when the ignition is switched off, they provide an electrical path to ground and wherein said switching element further includes a diode for passing current from said one terminal through said warning device and said daily consumer when the ignition switch is off.

11. A device according to claim 1, wherein the vehicle further includes windscreen wipers and a windscreen wiper circuit, and wherein said switching element further includes switching value displacement means, connected to said windscreen wiper circuit, for raising said light intensity level when said windscreen wipers are switched on.

12. A device according to claim 11, wherein said switching element includes a threshold switch responsive to said light sensor and having a threshold range defined by first and second switching states at lower and higher light intensity values, respectively, said warning device being activated at said lower intensity value and deactivated at said higher intensity value; and wherein said switching value displacement device displaces said threshold range towards a greater light intensity when the windscreen wipers of the vehicle are switched on.

13. A device according to claim 11, wherein said device has only two terminals connected to the lighting circuit and ignition switch on the vehicle and one terminal connected to the windscreen wiper circuit.

14. A device according to claim 1 when mounted in a vehicle, wherein the light sensor is disposed in the region of the pedal area in the front part of the motor vehicle interior.

15. A device according to claim 1, wherein the light sensor is adjustable by altering a light-inlet aperture leading to it, and the light-inlet aperture is adjustable by means of a shutter which forms the movable part of a switch for at least partial disconnection of the device.

16. A device according to claim 1, when mounted in a vehicle and connected in the lighting circuit of the vehicle, wherein the warning device is also arranged to be activated by the switching element when the regulation lights are switched on with the light intensity above said level.

17. A device according to claim 16, wherein the warning device is ready to be activated by the switching element to indicate when the regulation lights are on with the light intensity above said level even if the warning device is switched off with respect to indicating when the light intensity falls below said level with the ignition switch on and the regulation lights off.

18. A device according to claim 16, wherein the warning device produces a warning signal to indicate when the regulation lights are on with the light intensity above said level which is different from the warning signal to indicate when the regulation lights are off with the light intensity below said level and the ignition switch on.

19. A device according to claim 16, further comprising a second light sensor, connected to the switching element, for sensing when the regulation lights are on in daylight.

20. A device according to claim 1, wherein said warning device produces a warning signal having different intensities, and wherein the intensity of the warning signal is increased with decreasing environmental light intensity.

21. A device according to claim 20, wherein said warning signal is a light which is capable of flashing, and the different intensities are different flashing periods.

* * * * *